Patented July 11, 1933

1,917,398

UNITED STATES PATENT OFFICE

CYRIL J. STAUD AND THOMAS F. MURRAY, JR., OF ROCHESTER, NEW YORK, ASSIGNORS TO EASTMAN KODAK COMPANY, OF ROCHESTER, NEW YORK, A CORPORATION OF NEW YORK

METHOD FOR THE PRODUCTION OF LOW VISCOSITY CELLULOSE DERIVATIVES

No Drawing.   Application filed June 24, 1929.   Serial No. 373,470.

This invention relates to a method for reducing the solution viscosity of cellulose derivatives and particularly to a method of reducing the viscosity of cellulose acetate by the use of an aqueous solution of an oxidizing agent.

The production of cellulose esters is well known to those skilled in this art and no more than a reference thereto need be made for the understanding of this invention. For instance, the production of cellulose acetate divides itself normally into three steps comprising, (1) the pre-treatment of the cellulose with acetic acid with or without a catalyst; (2) the acetylation of the pre-treated cellulose with acetic anhydride; and (3) the hydrolysis of the acetylated cellulose by destroying the anyhdride with a small amount of water. The control of the viscosity which the finished cellulose acetate will have upon solution thereof in a suitable solvent is important. The control of such viscosity during the production of the cellulose acetate has been found to have a number of difficulties and to require a rather perfect technique of operation in producing a cellulose acetate of the desired viscosity without affecting the character of the cellulose acetate in a deleterious manner.

We have discovered that the viscosity may be lowered and that even the solubility of the cellulose ester, such as cellulose acetate, may be changed by the treatment of the ester with an aqueous solution of an oxidizing agent, such as potassium permanganate, dichromate, perchlorate or persulfate.

As an example of our invention, but by which we do not intend to limit ourselves, we may state that 15 grams of acetone soluble cellulose acetate was treated with 500 ccs. of a 7 percent solution of potassium permanganate for approximately 24 hours, this being in the ratio of approximately 30 parts of solution to one part of cellulose acetate. The suspension of the acetate in the permanganate solution was occasionally stirred to obtain a better reaction. Following this treatment the cellulose acetate was filtered off, the excess potassium permanganate being removed by washing with water. The residue which possesses the characteristic permanganate color was decolorized by stirring it into a solution of sodium bisulfite to which a small amount of hydrochloric or sulfuric acid may be added if necessary. Following this treatment the residue was separated by filtration, thoroughly washed with water and air dried. We found the weight of the product to be approximately 12 grams. Whereas the original acetate was acetone soluble and would form a comparatively thin dope when dissolved in acetone in the ratio of 1 to 5 we found that the acetate as treated by the above method when dissolved in acetone in the same 1 to 5 ratio would give a soft pasty mass indicating that it was not as soluble in acetone as prior to treatment. However, we found that one gram of the treated cellulose acetate when dissolved in a mixture composed of 3 ccs. of anhydrous acetone and 1.5 ccs. of water would give a very thin solution indicating that the viscosity of the acetate had been very materially lowered although the solubility of the acetate in acetone had been lessened. We also found that one gram of the treated cellulose acetate would dissolve in a mixture composed of 3 ccs. of anhydrous acetone and ½ cc. of water to give a thin dope. We also found that one gram of the treated cellulose acetate, when dissolved in a mixture composed of 3 ccs. of anhydrous acetone and ½ cc. of methyl alcohol, that a very thick dope resulted but that if an additional ½ cc. of methyl alcohol were added a much thinner and an easier flowing dope would result.

It is to be noted that the addition of water or methyl alcohol to anhydrous acetone does not produce a thin dope with the untreated cellulose acetate.

It will be apparent, therefore, we have discovered that when cellulose acetate is treated for a relatively long time with a solution of a good oxidizing agent such as potassium permanganate, dichromate, perchlorate, persulfate or similar oxidizing agent that the viscosity of the cellulose acetate will be reduced as much as ½ or more without any undesirable degradation of the cellulose molecule. At the same time, whether desirable or not, our treatment will change the solubility of the acetate from one soluble in acetone to one freely soluble only in a mixture of acetone and water or methanol.

Obviously various changes can be resorted to in the treatment of cellulose acetate as outlined above. For instance the corresponding alkali or alkaline earth salts which are good oxidizing agents may be employed in place of the potassium salts. Also by varying the concentration of the oxidizing agent in solution the time required for treating the cellulose acetate may be correspondingly reduced or increased dependent, of course, upon whether it is desired to unquestionably avoid any degradation of the cellulose molecule (whereupon a weak solution is employed) or whether such degradation is unimportant (whereupon a strong solution may be employed). Also, other decolorizing agents than sodium bisulfite may be used as will be apparent to those skilled in the art and in fact may not even be necessary if the oxidizing agent does not stain the cellulose acetate.

Although we have described our invention as being practical at approximately atmospheric temperatures it is obvious that well known temperature controlling means may be employed. Should it be desired to accelerate the reaction, the reaction temperature may be allowed to increase or vice versa.

In any event it will be apparent that one of the features of our invention is the discovery that the viscosity of cellulose acetate may be materially reduced by the treatment of the acetate for a period of time in an aqueous solution of an oxidizing agent.

In the foregoing specification and in the claims appended hereto, where reference is made to the viscosity of a cellulose ester such as cellulose acetate or cellulose nitrate, such terminology is used somewhat loosely and it is intended to refer to the viscosity which that cellulose ester would have when dissolved in a given quantity of a suitable solvent. Also, ozone is used to indicate an ozone bearing gas.

Furthermore, where the term "air-dried cellulose acetate" is used it is intended to refer to acetate which is in the precipitated or gelatinated air-dried form, such as acetate which has been precipitated and dried following hydrolysis or acetate which is in the form of films, such as film scrap.

What we claim as our invention and desire to be secured by Letters Patent is:

1. The process of reducing the viscosity of cellulose aliphatic carboxylic esters which comprises treating the ester with an aqueous solution of potassium permanganate at approximately normal temperature.

2. The process of reducing the viscosity of cellulose acetate which comprises treating the acetate with an aqueous solution of potassium permanganate at approximately normal temperature.

3. The process of reducing the viscosity of cellulose acetate which comprises treating the acetate with an aqueous solution of potassium permanganate containing about 7% of the latter.

4. The process of reducing the viscosity of cellulose acetate which comprises treating the acetate with approximately 30 parts of a 7% aqueous solution of potassium permanganate for about 24 hours.

5. The process of reducing the viscosity of cellulose aliphatic carboxylic esters which comprises treating the ester with an aqueous solution of a permanganate of an alkali forming metal at approximately normal temperature.

6. The process of reducing the viscosity of cellulose acetate which comprises treating the acetate with an aqueous solution of a permanganate of an alkali forming metal at approximately normal temperature.

Signed at Rochester, New York, this 15th day of June 1929.

CYRIL J. STAUD.
THOMAS F. MURRAY, Jr.